United States Patent [19]

Okubo

[11] 4,164,149

[45] Aug. 14, 1979

[54] METHOD AND SYSTEM FOR MONITORING THE ANGULAR DEFORMATION OF STRUCTURAL ELEMENTS

[76] Inventor: Shigeo Okubo, 350 Sharon Park Dr., Apt. E24, Menlo Park, Calif. 94025

[21] Appl. No.: 904,153

[22] Filed: May 9, 1978

[51] Int. Cl.$^2$ ............................................. G01N 29/00
[52] U.S. Cl. ........................................ 73/594; 73/583
[58] Field of Search ................. 73/594, 579, 583, 584, 73/650, 649, 788, 854

[56] References Cited

U.S. PATENT DOCUMENTS

| | | | |
|---|---|---|---|
| 3,224,253 | 12/1965 | McKay | 73/594 |
| 3,641,811 | 2/1972 | Gnaedinger, Jr. et al. | 73/594 |

*Primary Examiner*—Jerry W. Myracle
*Attorney, Agent, or Firm*—Townsend and Townsend

[57] ABSTRACT

A method and system for monitoring the angular deformation of structural elements in a composite structure in response to imposed mechanical vibrations in which the structure is part of the monitoring system.

A plurality of angular motion signal generating sensors are provided at different selected locations in a composite structure, each sensor being associated to a corresponding structural element. Signals output from the sensors in response to vibrations propagated within the composite structure are detected and a vibration signature for the entire structure is established. The sensor outputs are subsequently monitored and compared with the previously established vibration signature to detect differences therebetween designating changes in the vibration response and potential structural failures.

The angular motion sensors employ a magnet and a coil in which a voltage and current are induced in response to angular deflections of the structural member to which the sensor is attached. Several alternate sensor configurations are shown.

15 Claims, 11 Drawing Figures

U.S. Patent  Aug. 14, 1979  Sheet 1 of 3  4,164,149
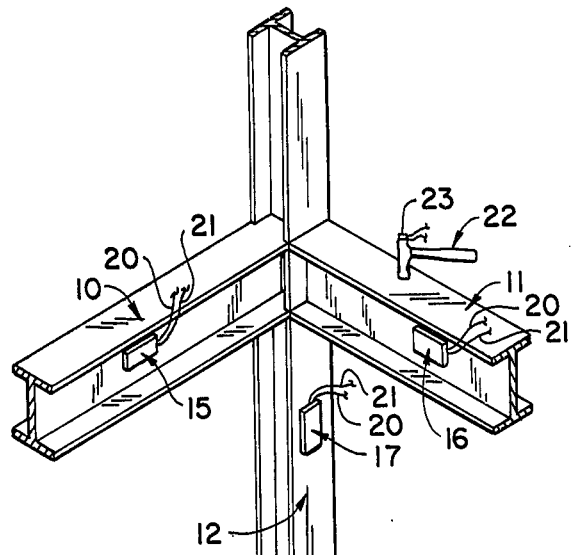
FIG._1.
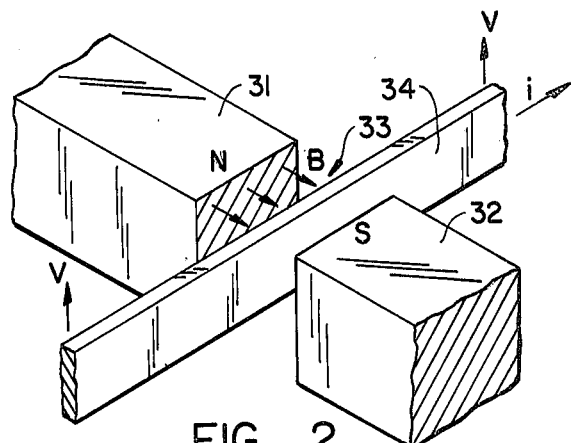
FIG._2.
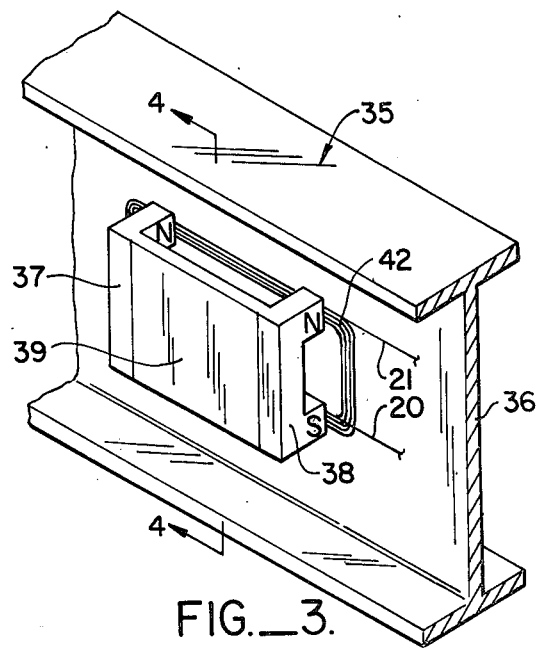
FIG._3.
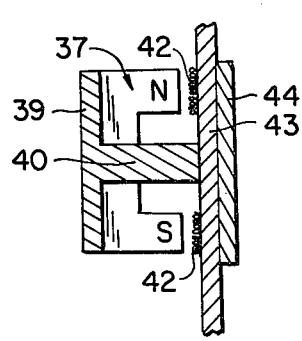
FIG._5.
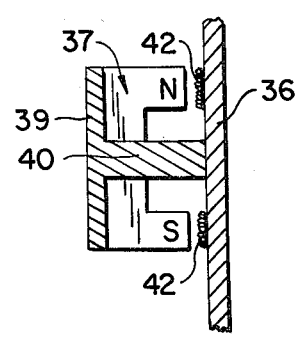
FIG._4.

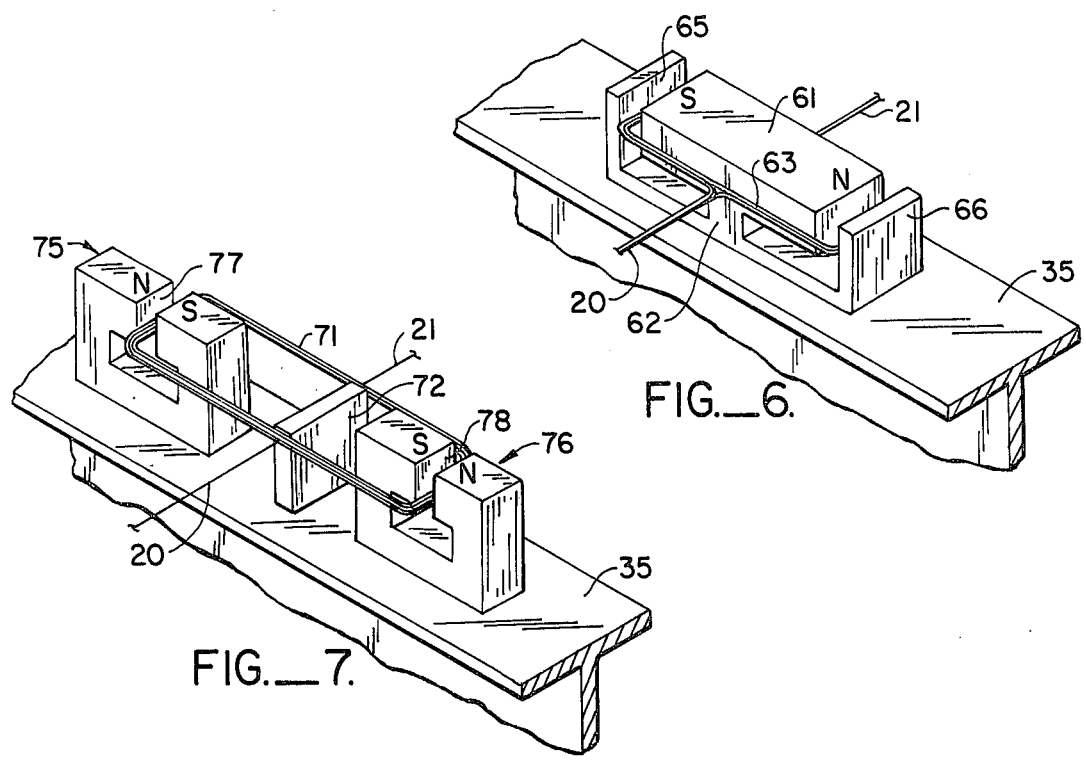
FIG._6.
FIG._7.
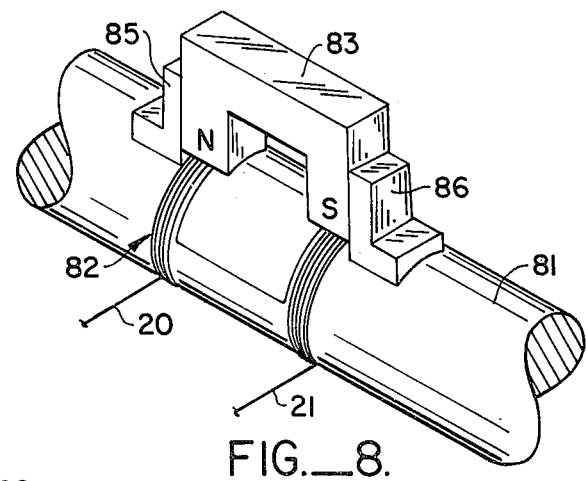
FIG._8.
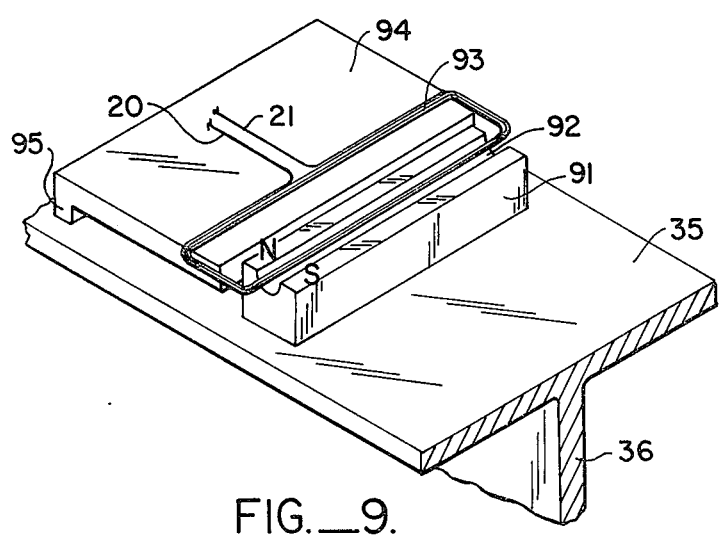
FIG._9.

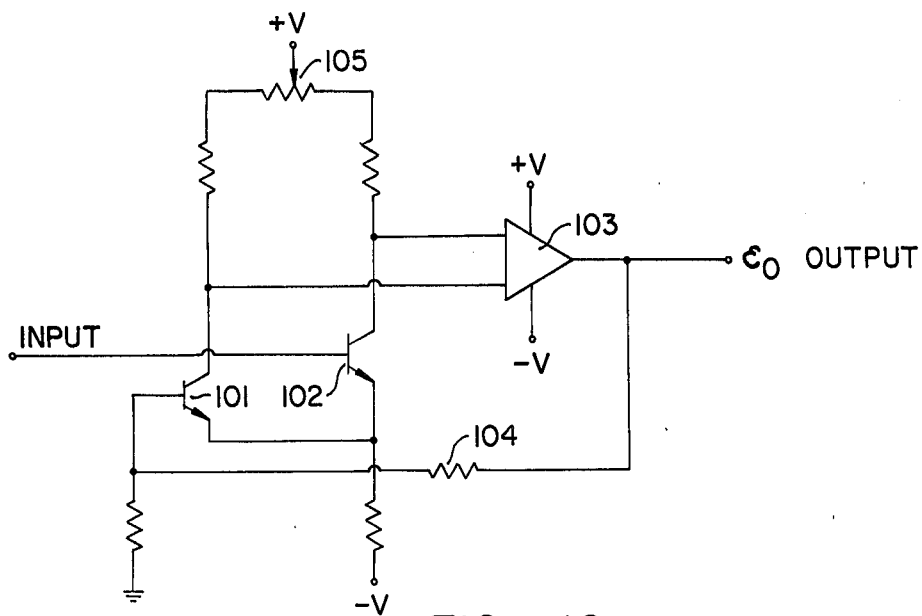
FIG.__10.
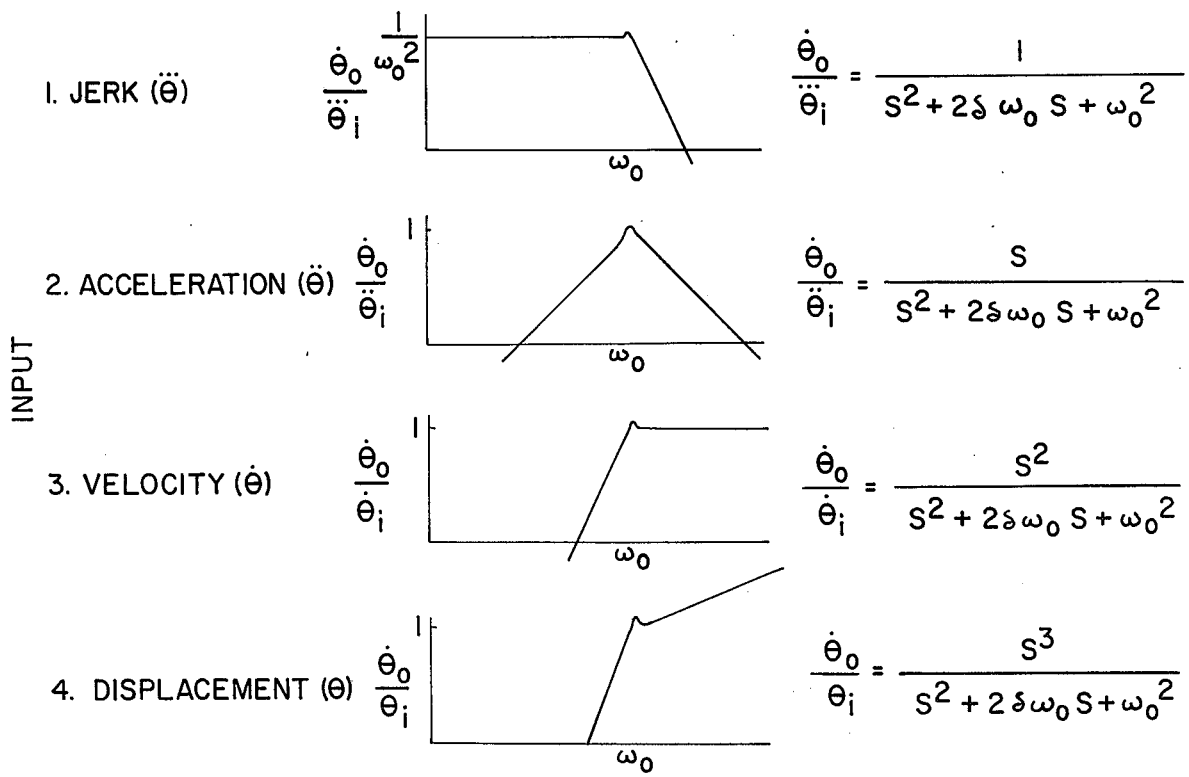
FIG.__11.

METHOD AND SYSTEM FOR MONITORING THE ANGULAR DEFORMATION OF STRUCTURAL ELEMENTS

BACKGROUND OF THE INVENTION

This invention relates to systems and methods for analyzing the vibrational behavior of composite mechanical structures, such as buildings, aircraft, machines, dams and the like.

Composite structures, such as buildings, aircraft, dams, machines and the like are designed to withstand either theoretically calculated or empirically determined maximum loads and stresses in the environment for which they are intended. However, the actual response of such structures to varying environmental conditions, such as wind stress, alteration of subsoil conditions, acceleration forces, and aging of the component structural elements, typically varies with time and catastrophic failure may occur unless the mechanical and structural characteristics are monitored. In the past, the continuing structural performance of composite structures has been monitored, if at all, primarily by means of linear displacement sensors, such as strain gauges, pressure transducers, accelerometers and the like, all of which respond only to linear motion. Further, such devices have typically been used to monitor only specific individual structural elements, such as wing struts in an aircraft or critical load beams in the case of buildings. In such prior art methods of monitoring the integrity of composite structures, the principal object has been to determine the loading or the deflection in the structural component to which the linear motion transducers have been attached. The chief disadvantage to such an approach lies in the fact that only the static characteristics of the individually monitored structural elements are placed under observation which, except in the case of an obvious fracture of a beam or other catastrophic failure, provides no information with respect to the dynamic response of the individual elements or the relative integrity of the remaining structural elements, whose failure could also cause impairment or total destruction of the composite structure. In addition, the use of linear motion sensors to detect structural characteristics suffers from the further disadvantages that such devices also detect noise or rigid body inertial motions, which must be somehow compensated for by electrical or mechanical filtering, thereby requiring relatively sophisticated electrical or mechanical circuits for this purpose. Moreover, most linear motion sensors require a local source of electrical power for proper operation, which is not always available at remote sensor locations without special wiring or the provision of independent battery operated power supplies. Further, many linear motion sensors have a mass of sufficient size as to alter the vibration characteristics of the structural element to which the device is attached, which not only renders calibration of the sensor more difficult, but also requires subjective interpolation of the vibrational response signals from the sensor.

SUMMARY OF THE INVENTION

The invention comprises a method and system for monitoring the vibration characteristics of composite structures which is devoid of the above-noted disadvantages, and which permits both the static and the dynamic performance of a composite structure to be monitored in such a way that incipient structural failure due to imposed loading conditions can be predicted in advance so as to permit avoidance of catastrophic failure.

In its broadest aspect, the invention comprises a method and system in which a plurality of lightweight, low cost angular motion sensors are provided at selected locations in a composite structure to be monitored, initially for the purpose of obtaining the "vibration signature" of the composite structure as a whole and subsequently for determining changes in this vibration signature, which indicate corresponding changes in the structural characteristics of one or more individual structural components. Thus, the composite structure itself comprises a portion of the monitoring system. The vibration signature of the composite structure is established by comparing the amplitude, phase and frequency characteristics of a local input signal generated by a given sensor with the same characteristics of the signals generated by the remaining angular motion sensors, typically by using fast Fourier transform techniques. The vibrations may be either induced at each selected location, e.g., by striking the location with a hammer or other impulse generating means; or in the case of ground structures the naturally occurring microseismic vibrations may be employed for this purpose. In addition, when induced vibrations are used to obtain the vibration signature of the composite structure, a transducer may be attached to the impulse generating instrument and the output signal from this transducer employed as the vibration input signal for purposes of comparison. In all cases, the ratio of the output signals from the individual remotely located angular motion sensors to the input signal from the local sensor is used to obtain the vibration signature of the composite structure.

The preferred angular motion sensors employed in the system are velocity pick-off sensors, each comprising an electrically conductive member, such as a coil, and a magnet, preferably a permanent magnet, with one of the elements being attached to a structural element at spaced locations therealong so as to follow the angular deflection of the associated structural element, and the remaining element being attached in an essentially rigid manner so as to be substantially unaffected by such angular deflection. Relative motion between the coil and the magnet generates an electrical current in the conductive member, which is coupled to either a local or remote amplifying circuit, the output of which may be connected to any one of a number of measuring instruments, such as a fast Fourier transform analyzer, a strip chart recorder, an oscilloscope or the like. While the preferred angular motion sensors provide electrical output signals which are representative of the angular velocity of deflection of the associated structural element, other signals representative of angular displacement, angular acceleration and angular jerk (the time derivative of angular acceleration) may be directly derived from the velocity signals by the use of known differentiation or integration circuits.

The angular sensors are capable of detecting extremely small angular measurements of the structural components to which they are attached and therefore can provide highly precise information useful in analyzing a wide variety of structural parameters, such as the live load on a building, the wind load and stresses on a building or an aircraft, the effect of seismic motion on buildings, dams, and highways, the dynamic behavoir of tall buildings under wind loads, the turn rate/acceleration of aircraft, the gyroscopic torque of aircraft engines, and the detection of flaws in machine bearings, to name a few. Due to the low cost of the preferred velocity pick-offs, a large array of these devices may be permanently installed throughout the structure, either when initially constructed or thereafter, and no electrical power need be applied to the individual pick-offs. Further, since the angular sensors have relatively small mass, installation of such sensors on the structural element does not alter the structural characteristics thereof. In addition, such sensors are devoid of mass-spring-damper elements, and thus there is no necessity to match the mechanical impedance of such devices with the mechanical impedance of the attaching structural member.

For a fuller understanding of the nature and advantages of the invention, reference may be had to the ensuing detailed description when taken in conjunction with the accompanying drawings.

BRIEF DESCRIPTION OF THE DRAWINGS

FIG. 1 is a schematic diagram of the elements of a composite structure illustrating the concept of the invention;

FIG. 2 is a schematic illustration of the principle of operation of the preferred angular motion sensor;

FIG. 3 is a partial perspective view of a first embodiment of the velocity pick-off sensor;

FIG. 4 is a sectional view taken along lines 4—4 of FIG. 3;

FIG. 5 is a sectional view similar to FIG. 4 illustrating an alternate embodiment of the velocity pick-off sensor;

FIGS. 6-9 are partial perspective views illustrating alternate embodiments of the velocity pick-off sensor;

FIG. 10 is a circuit diagram of an amplifier suitable for use with the various velocity pick-off sensor embodiments; and FIG. 11 is an illustration of the transfer functions obtainable with the several embodiments of velocity pick-off sensor.

DESCRIPTION OF THE PREFERRED EMBODIMENTS

Turning now to the drawings, FIG. 1 schematically represents and illustrates the invention. As seen in this figure, a plurality of structural elements 10-14 of a composite structure, which in the illustration comprise vertical and horizontal support beams for a building, are each provided with a local transducer 15-19 each mechanically secured to a different associated structural element. Each transducer comprises an angular motion sensor, preferably of the type described below, each having electrically conductive output leads 20, 21 to be coupled to appropriate measurement and detection apparatus for the purpose described below. Each angular motion sensor 15-19 is capable of generating electrical signals representative of the angular motion experienced by its corresponding structural element in response to mechanical vibrations thereof. Such signals may comprise either variable current or variable voltage signals, depending on the particular angular motion sensors employed, and are representative of angular (as opposed to linear) deflection of the associated structural elements.

Also illustrated in FIG. 1 in schematic form is a local mechanical impulse generating means, e.g., a hammer 22 to which a suitable transducer 23 is coupled. Local impulse generating means 22 is employed according to one embodiment of the invention for introducing local input vibrations into the composite structure at selected locations for the purpose of enabling measurement of the mechanical response of the composite structure to such input vibrations. For this purpose, transducer 23 generates electrical output signals representative of the amplitude and phase of the local input mechanical vibrations generated whenever impulse generating means 22 strikes a structural element at a selected location.

In operation, the composite structure whose characteristics are to be monitored is initially analyzed by obtaining the vibration signature of the structure as a whole. This may be done using one of two alternative input mechanical vibration sources. The first mechanical input vibration source comprises impulse generating means 22 and the procedure followed is to strike some or all of the structural elements comprising the composite structure at selected locations and determining the amplitude and frequency content of the electrical signals output from the angular motion sensors 15-19 (which signals are the electrical analogs of the mechanical vibrations conducted through the structure from the point of impact). The vibration signature may then be obtained by comparison of the output signals from the individual angular motion sensors and the input signal from transducer 23. The comparison may be effected using a plurality of known conventional techniques in which the amplitude, frequency and phase characteristics of the individual output signals are compared with these same characteristics of the input signals. One such technique which has been found to yield useful results is a fast Fourier transform analysis performed on a Hewlett-Packard type 5451B fast Fourier analyzer. Other techniques such as those employed in the dimensional analysis of structural models, acoustic emission studies and geophysical prospecting will occur to those skilled in the art.

As an alternative to applying intentionally induced vibrations by means of impulse generating means 22 or the equivalent, the microseismic vibrations experienced by composite building structures, such as highrise office buildings, dams and the like, may be employed for the purpose of establishing the vibration signature of the composite structure. In accordance with this alternative method, the input signals are obtained from geophones or other seismic vibration detectors which may be mounted in the basement of a building, or at the foot of a dam, and one or more such geophones may be utilized.

In either of these two methods, the ratio between the output signals and the input signal is obtained during the comparison so that the absolute magnitude of the input vibration signal is factored out of the vibration signature analysis. Stated differently, the important parameters are the relative values of the amplitude, frequencies and phases of the output and input signals, rather than the absolute magnitude thereof.

Once the vibration signature of an existing or a new structure have been so obtained, the composite structure is periodically tested and monitored using either the impulse injection technique or the microseismic technique, and the amplitude, phase and frequency response is compared with the previously obtained vibration signature of the same composite structure. Substantial differences between the two indicate an alteration in the vibration characteristics of the composite structure, possibly indicating a potential catastrophic failure, and the structural element or elements whose characteristics have altered with time may be isolated by comparing the then-present output to input signal ratio from each of the individual local angular motion sensors with the initially obtained ratio. Once the structurally altered element has been so isolated, corrective measures, such as replacement of a beam (in the case of a building) or a strut (in the case of an aircraft) can be taken.

APPLICATIONS

Changes in the vibration signature of a composite structure may be used to determine changes in the loading or flexural rigidity of individual structural elements in the following manner. Natural resonant frequencies of prismatic beams can be represented by a mathematical expression containing the constant $$a^2 = EIg/A\gamma$$

E=modulus of elasticity; I=moment of inertia; g=gravitational acceleration; A=cross-sectional area; $\gamma$=weight of the beam per unit volume. Ordinarily, the fundamental or lowest natural frequency is of primary interest, and any change in the natural frequency must be attributable to changes in $a^2$. For beams with concentrated loads, the natural frequency is a function of the static deflection of the elastic member due to the action of the weight W acting on the beam. Further, the static deflection is also a function of the flexural rigidity EI. Accordingly, any change in the vibration signature of the structure can be attributed to a change in the loading W or a change in the flexural rigidity EI. Thus, by comparing the vibration signature of the composite structure at subsequent time periods with an initial signature, changes in either the loading or the flexural rigidity can be detected. Once a change is noted, stress path propagation studies may be used to detect structural anomalies using techniques similar to those employed in geophysical prospecting and acoustic emission studies, and the individual structural elements can be isolated. It should be noted that for members with more than one concentrated load, the fundamental resonant load (i.e., the natural frequency) can be very closely approximated by the expression:

$$\frac{1}{f_r^2} = \frac{1}{f_1^2} + \frac{1}{f_2^2} + \ldots + \frac{1}{f_i^2}$$

where $f_i$ are the individual resonances due to each individual load (Dunkerley's Method). In such an analysis, it is important that the sensors employed introduce no significant perturbations to the resonant frequencies of the individual structural members. In the instant invention, since the angular motion sensors have an extremely light mass, this condition is fulfilled. In addition, the particular angular motion sensors discussed below exhibit high sensitivity which enables the detection of extremely low natural frequencies of less than 1 Hz.

Tensile and compressive loading analyses may also be employed according to the invention on composite structures to predict incipient failure of a beam in tensile or compressive loading in the following manner. According to the Euler critical load theorem (as applied to a column) the natural frequency of a column is altered by tensile or compressive loading by a factor of $$1 \pm \frac{Sl^2}{EI\pi^2}$$

where S=the axial load; l=length of the column; and the quantity $$\frac{EI\pi^2}{l^2}$$

is the Euler critical load. With tensile loading, the column natural frequency increases by this factor, while with compressive loading the frequency decreases by this factor. Thus, by monitoring the natural frequency of a loaded column and observing changes in this frequency, using the angular motion sensor associated thereto, an incipient catastrophic load can be predicted sufficiently in advance to take corrective action.

In aircraft, the turn rate/acceleration and the inertial forces applied to individual structural elements can be determined by the magnitude of the angular deflection of key elements, e.g., a wing. Moreover, the invention can be used in a servo-feedback system to monitor the angular deflection of structural elements, particularly airfoil support surfaces, in a similar manner to that described above to preclude the application of critical stresses to such members. In such applications, conventional electronic circuitry can be employed to either differentiate or integrate the actual angular sensor output signals to obtain signals representative of actual angular displacement, velocity, acceleration or jerk (time rate of change of acceleration), which may then be compared with design figures for several parameters of the corresponding structural elements and employed as a control signal to avoid incipient failure conditions.

Central to the invention and to the several possible applications thereof is the use of the entire composite structure as a sensor. More specifically, according to the invention the entire composite structure forms an integral portion of the monitoring system so that each structural element of the composite structure contributes to the totality of the mechanical vibration characteristics evidenced at the individual angular motion sensor locations, which is just the actual operating environmental conditions to which the composite structure is ordinarily subjected. Thus, a true indication of the vibrational characteristics of the entire composite structure is obtained according to the invention, and any significant changes in the vibration signature of the structure as a whole are indicative of actual structural changes. Thus, rather than simulate an operating environment, or measure the response of only individual structural elements, which may or may not be key elements responsible for incipient failures, the invention provides a true measure of the actual physical condition of the structure being monitored.

ANGULAR MOTION SENSORS

As noted above, the invention employs angular motion sensors which are capable of generating electrical signals representative of the angular motion experienced by the corresponding structural element in response to mechanical vibrations experienced by such element; moreover, such signals may comprise either variable current or variable voltage signals and are representative of angular (as opposed to linear) deflection of the associated structural element. While several different types of angular motion sensors may be employed, such as the flexural rigidity sensor disclosed in co-pending Patent Application Ser. No. 864,427 filed Dec. 27, 1977, the temperature stable displacement sensor with fine resolution disclosed in U.S. Patent Application Ser. No. 845,530 filed Oct. 26, 1977, the disclosures of which are hereby incorporated by reference; and triboelectric transducers of the type disclosed in U.S. Pat. Nos. 2,787,784 and 3,763,482; the preferred angular motion sensor comprises a velocity pick-off of the following design which utilizes the voltage and current induced in a conductor moving in a magnetic field.

With reference to FIG. 2, a magnet having a north pole 31 and a south pole 32 is provided with a gap 33 across which the magnetic field B extends between the poles. A conductor 34 is positioned within the gap 33 and, when relative motion occurs between the conductor 34 and the magnetic field B a voltage E is induced whose magnitude is equal to Blv, where l is the length of the conductor 34 in the field and v is the velocity of the conductor 34 in a plane perpendicular to the magnetic field B. The current induced in a closed loop conductor in a field is given by the expression:

$$i = \frac{Blv}{R}$$

where R is the loop resistance. By attaching either the magnet including pole portions 31, 32 or the conductor 34 to the corresponding structural element, and connecting the remaining element to a "rigid support" attached either to the same structural element or a different structural element, the relative velocity between the magnet and the conductor can be detected by measuring either the voltage or the current. Further, by time integrating the velocity signal using conventional electrical integrating circuitry, the displacement can be measured as well. Similarly, by differentiating the velocity signal using conventional electrical differentiation circuitry, the acceleration (second time derivative) and the jerk (third time derivative) can be measured as well.

With reference to FIGS. 3 and 4, a first embodiment of a velocity pick-off is shown attached to an I-beam structural element 35 having interconnecting web portion 36. As seen in these figures, the velocity pick-off comprises a pair of permanent magnets 37, 38 each having a north and a south pole and spacially separated by a T-shaped connecting piece 39 having a pedestal portion 40. As best shown in FIG. 4, pedestal portion 40 is rigidly secured to web 36 in surface contact therewith over a relatively small area so that the magnets 37, 38 do not follow angular bending motion of the beam 35. Support pedestal 40 may be secured to web 36 by any suitable means, such as an adhesive (e.g., epoxy resin), brazing, welding or the like. Adhered to a relatively large surface area of web 36 (as compared to the magnitude of the surface contact between support pedestal 40 and web 36) is a multiple turn coil 42 which is capable of following bending motion of web 36 and thus I-beam 35. Coil 42 is arranged within the gap between the individual poles of each magnet 37, 38 and closely adjacent portions of web portion 36 so that motion of coil 42 cuts the magnetic lines of force passing therethrough. It should be noted in the arrangement of FIGS. 3 and 4 that the web portion 36 should be fabricated of a magnetizable material, such as iron or steel in order to provide a reluctance path for the magnetic field between the north and south poles of each of the magnets 37, 38. For those structural elements which do not meet this criteria, the arrangement of FIG. 5 may be employed. As seen in this figure, the web portion designated with reference numeral 43 and fabricated from a non-magnetizable or poorly magnetizable material such as aluminum, is provided with a backing element 44 fabricated from iron, steel or other magnetizable material in order to provide a magnetic field path of relatively low reluctance.

FIG. 6 illustrates an alternate embodiment of the velocity pick-off in which the magnet 61 is rigidly supported on the structural element 35 by means of a central pedestal portion 62 for relative insensitivity to angular deflection of beam 35, while coil 63 is supported for angular motion in response to bending of beam 35 by means of upstanding end support portions 65, 66 to the inner surfaces of which coil 63 is secured, e.g., by gluing.

FIG. 7 illustrates still another alternate embodiment in which the coil is relatively rigidly mounted to the beam 35 by means of a pedestal support 72 while a pair of individual magnets 75, 76 are secured directly to beam 35 at spaced locations therealong in order to provide the requisite relative motion between the magnetic field in the gaps 77, 78 and coil 71.

FIG. 8 illustrates an arrangement suitable for use with round structural elements, such as wing strut 81, in which a coil 82 is wound about the outer surface thereof and has two principal windings: one underlying the north pole of the magnet 83, another underlying the south pole of the same magnet. Magnet 83 is secured to the strut 81 by means of L shaped support members 85, 86.

FIG. 9 illustrates still another alternate embodiment of the velocity pick-off in which an elongated longitudinally extending magnet 91 having an elongated gap 92 between the north and south poles thereof is arranged transversely of beam 35 and is secured thereto, while a coil 93 is supported by a base member 94 having essentially a line contact support pedestal 95 for securing this assembly to the beam 35, the coil 93 being suspended within the gap 92.

As will be apparent to those skilled in the art, other equivalent conductor-magnet arrangements may be employed without departing from the spirit and scope of the invention.

FIG. 10 illustrates a drift compensated conventional amplifier circuit suitable for use in amplifying the electrical output signal from any one of the above-noted embodiments of the velocity pick-off. The circuit of FIG. 10 includes a pair of transistors 101, 102, an operational amplifier 103, preferably a type LM101A amplifier, a feedback resistance 104 and an adjustable resistance 105 used to initially null the circuit. The amplifier circuit of FIG. 10 is preferably located closely adjacent the site of the associated velocity pick-off, although in some applications, particularly when low loss conductors 20, 21 are employed, the circuitry may be located at a remote distance from the individual associated velocity pick-off.

The sensitivity of any of the above velocity pick-offs may be optimized in accordance with the following considerations. From the expression noted supra for the current induced in a closed loop conductor, by increasing the magnitude of the magnetic field B and the length l of the conductor, and reducing the resistance R, the sensitivity of the sensor may be maximized. Thus, although it is not required that extremely "powerful" magnets be employed, preferably magnets exhibiting a relatively high magnetic field strength are preferred, such as samarium cobalt magnets. In addition, since the output signal $E_0$ from the circuit of FIG. 10 is given by the expression:

$$E_0 = iR_f$$

where i is the induced current and $R_f$ is the feedback resistance 104, the sensitivity may be further increased by choosing a high value for the resistance 104. In circuits actually constructed, feedback resistances as high as 50 megohms have been employed with successful results.

In general, the velocity pick-offs employed preferably should be light in weight in order to impose no observable mechanical impedance loading to the structural element to which the sensor is attached. As will be apparent to those skilled in the art, the preferred velocity pick-off can be fabricated at extremely low cost, which permits such sensors to be permanently installed in the composite structure to be monitored. In addition, since the seismic mass normally found in linear displacement sensors, i.e., the mass-spring-damper elements, are completely absent from the preferred velocity pick-off, mechanical impedance matching is not required between the velocity pick-off and its associated structural element.

FIG. 11 illustrates various transfer functions obtainable with velocity pick-off sensors of the type described supra. As noted previously, the velocity pick-off generates an output signal which is proportional to the velocity of the conductor in the magnetic field, which in turn is proportional to the velocity of angular displacement of the structural element to which the sensor is attached. The transfer functions shown in FIG. 11 are obtainable by taking the ratio of the output of the velocity pick-off (proportional to angular velocity) to the input motion to which the sensor is subjected for each of four cases: Jerk (third time derivative of the angular displacement), acceleration (second time derivative of angular motion), velocity (first time derivative of angular displacement), and displacement. Each transfer function is a plot of frequency versus one of the four above-noted ratios, and the mathematical expression for each ratio is given to the right of the transfer function characteristic plot. The flat response of the velocity pick-off to jerk in the region below the natural frequency $\omega_0$, and to velocity above the natural frequency makes the velocity pick-off extremely usable for these measurements. At very high frequencies, the velocity pick-off becomes a very sensitive angular displacement detector. Measurements as small as $10^{-9}$ radian or better can be detected with such devices.

Velocity pick-offs according to the invention have the following desirable characteristics. Firstly, all components are passive and require no external power which eliminates the requirement for either individual battery packs (and the attendant monitoring and maintenance thereof) or extensive power wiring of the composite structure to be monitored. In addition, the velocity pick-off responds to only relative velocity between the conductor and the magnet. Thus, very slow changes in temperature and null positions do not adversely affect the output signals and, correspondingly, the velocity pick-off is relatively easy to initialize and calibrate using dynamic inputs for the transfer function measurements.

In addition, sensitivity compatibility may be assured by the natural frequency of the member to which the velocity pick-off is attached. Generally, the lower the natural frequency $\omega_0$, the more sensitive the system is to jerk.

As will now be apparent, the invention provides a highly effective, low cost reliable system and method for monitoring the vibrational response of a wide variety of composite structures. Every structural element has a vibration signature as unique as a human fingerprint which, once determined, may be used as a standard of comparison to detect subsequent changes. Such vibrational signatures may be expressed in alternate chart forms: First, vibration amplitude versus frequency; and second, phase changes between output and input signals. Generally speaking, changes in amplitude/frequency are related to structural rigidity and load changes, whereas changes in frequency alone are caused by variations in the damping. In addition, fatigue studies have suggested that a change in the modulus of elasticity occurs which can affect both amplitude and frequency.

By placing angular motion sensors on the structural elements, such as columns and tie beams, of ground based structures (rather than employing accelerometers and/or seismometers on such structures), the angular deflection of the columns and tie beams may be monitored in order to provide an accurate indication of both the magnitude and the frequency of ground motion, and also the stress levels to which the monitored structural elements are subjected.

When applied to the vibration testing of aircraft structures and the like, the invention provides both significant and useful vibration data since the angular motion sensors may be secured to the structural members in such a manner as to greatly attenuate rigid body motions so that only angular deflections of the monitored structural member are detected. Further, in such applications, elaborate vibration isolation devices need not be employed, as formerly required.

The invention may also be used to establish the vibration signature of composite structures such as industrial machinery in order to monitor the integrity of the components thereof, such as the mechanical bearings customarily employed. In such applications, after initial establishment of the vibration signature of the machine, the sensor outputs may be periodically monitored and substantial changes in the vibration signature of the machinery provide an indication of bearing deterioration.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention which is defined by the appended claims.

What is claimed is:

1. A method of monitoring the angular deformation of structural elements in a composite structure in response to mechanical vibrations, said method comprising the steps of:
   (a) providing a plurality of angular motion signal generating sensors at different selected locations in said composite structure, each sensor being associated to a corresponding structural element;

(b) detecting the signals output from said signal generating sensors in response to vibrations propagated within said composite structure;

(c) establishing a vibration signature for said composite structure from the signals detected in step (b);

(d) subsequently detecting the signals output from said signal generating sensors; and (e) comparing the subsequently detected signals with said vibration signature to detect differences therebetween.

2. The method of claim 1 wherein said step (b) of detecting is preceded by the step of inducing vibrations in said composite structure.

3. The method of claim 2 wherein said step of inducing includes the step of generating a signal representative of the induced vibrations.

4. The method of claim 3 wherein said step (c) of establishing includes the step of forming the ratio between the output signals from individual ones of said signal generating sensors and said signal representative of said induced vibrations.

5. The method of claim 2 wherein said step of inducing vibrations includes the step of inducing vibrations at different locations in said composite structure.

6. The method of claim 1 wherein said step (a) of providing includes the step of employing a plurality of angular velocity signal generating sensors.

7. The method of claim 1 wherein said step (a) of providing includes the step of physically incorporating said sensors into said composite structure at said locations.

8. The method of claim 1 wherein said step (a) of providing includes the step of mounting an electrically conductive coil means and a magnet in operative association at each of said selected locations.

9. The method of claim 8 wherein said step of mounting includes the step of securing said coil means at spaced locations along said corresponding structural element so that said coil means follows the angular deflection thereof and mounting the associated magnet in such a manner as to be substantially insensitive to said angular deflection.

10. The method of claim 8 wherein said step of mounting includes the step of securing said magnet at spaced locations along said corresponding structural element so that said permanent magnet follows the angular deflection thereof and mounting the associated coil means in such a manner as to be substantially insensitive to said angular deflection.

11. A system for monitoring the angular deformation of structural elements in a composite structure, said system comprising:

a first plurality of selected ones of said structural elements;

a second plurality of angular motion signal generating sensors each positioned at a selected location on different ones of said first plurality of structural elements; and means for enabling detection of the output signals from said sensors.

12. The combination of claim 11 wherein said angular motion signal generating sensors comprise angular velocity sensors.

13. The combination of claim 11 wherein said sensors each includes a magnet and a coil means operatively associated with the corresponding structural element for generating a signal representative of the angular velocity of said corresponding structural element in reponse to mechanical vibrations thereof.

14. The combination of claim 13 wherein said coil means is secured to said corresponding structural element at spaced locations therealong for following the angular motion thereof, and said magnet is secured to said corresponding structural element in such as manner as to be insensitive to said angular motion.

15. The combination of claim 13 wherein said magnet is secured to said corresponding structural element at spaced locations therealong for following the angular motion thereof and said coil means is secured to said corresponding structural element in such a manner as to be insensitive to said angular motion.

* * * * *